United States Patent [19]

Prince

[11] Patent Number: 4,602,703
[45] Date of Patent: Jul. 29, 1986

[54] DISC BRAKE SYSTEM

[76] Inventor: Danny Prince, 3824 N. 35th St., Phoenix, Ariz. 85018

[21] Appl. No.: 638,018

[22] Filed: Aug. 6, 1984

[51] Int. Cl.$^4$ .............................................. F16D 55/22
[52] U.S. Cl. .................................. 188/72.3; 188/72.4; 188/73.39; 188/73.43; 188/250 G; 303/6 C; 303/7
[58] Field of Search ............... 188/73.43, 73.44, 73.45, 188/73.32, 73.31, 72.6, 72.4, 72.9, 71.1, 349, 3 R, 112, 18 A, 72.3, 216, 250, 73.39, 251; 303/6 C, 7, 47

[56] References Cited

U.S. PATENT DOCUMENTS

| 4,214,648 | 7/1980 | Kobayashi et al. | 188/73.39 |
| 4,219,106 | 8/1980 | Lüpertz et al. | 188/73.39 |
| 4,415,068 | 11/1983 | Gumkowski et al. | 188/72.3 |
| 4,440,267 | 4/1984 | El-Sheikh | 188/73.43 X |

Primary Examiner—Douglas C. Butler
Attorney, Agent, or Firm—Drummond & Nissle

[57] ABSTRACT

An improved disc brake system of the general type including a brake frame having a pair of spaced apart rails, a pair of brake linings slidably carried on the brake frame rails, a circular rotor rotatably carried on the wheel assembly of a vehicle and having smooth planar inboard and outboard contact faces, a caliper assembly slidably mounted on the rails of the brake frame, and, a brake pedal operatively associated with the caliper assembly, the caliper assembly having a piston which when actuated by depressing the brake pedal first forces one brake lining against the inboard contact face of the rotor and then causes the caliper assembly to slide along the brake frame rails to force the other brake lining against the outboard contact face of the rotor. The improved disc brake system minimizes the amount of heat generated when the brake linings frictionally contact the rotor and markedly increases the operational life of the rotor and brake linings.

5 Claims, 13 Drawing Figures

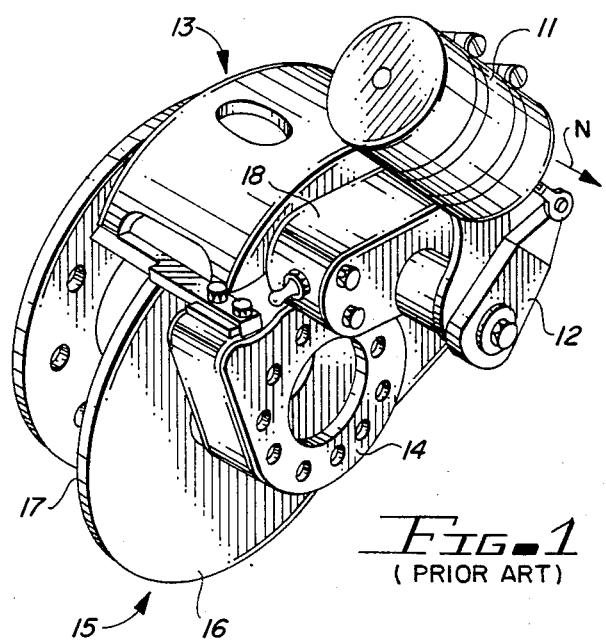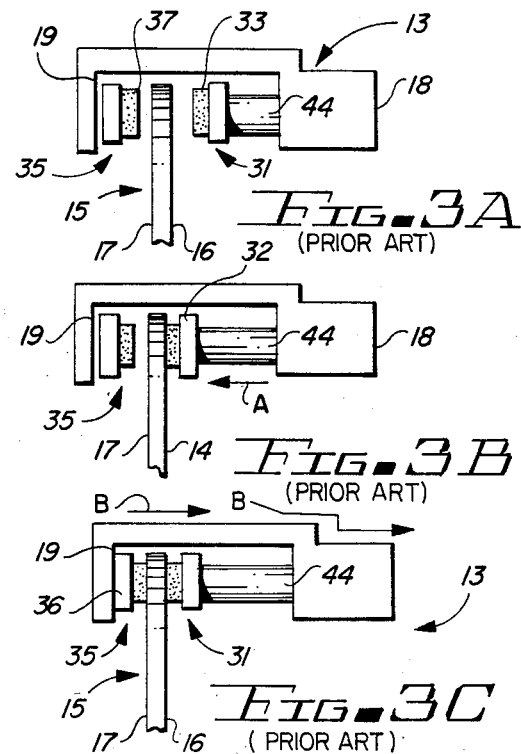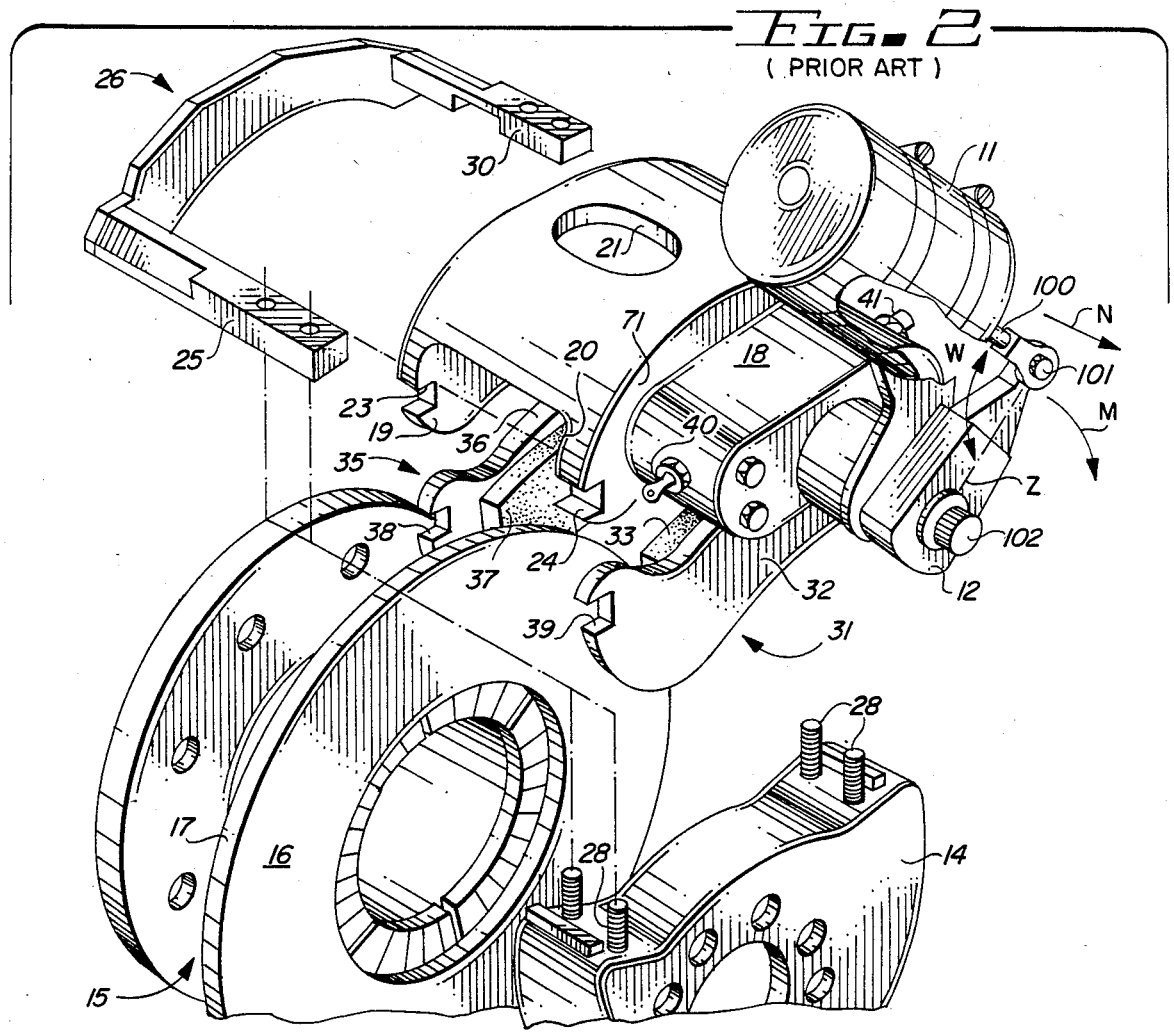

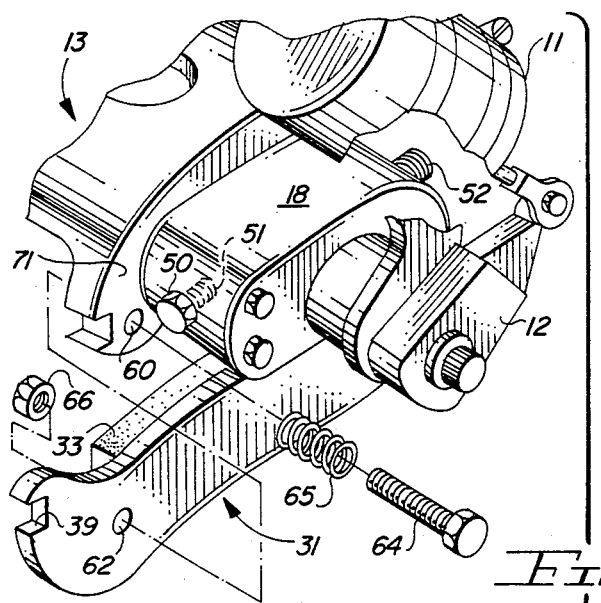
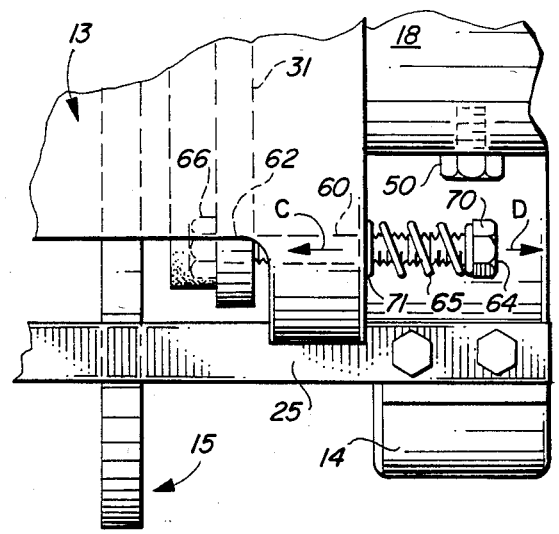
FIG.-4  FIG.-5
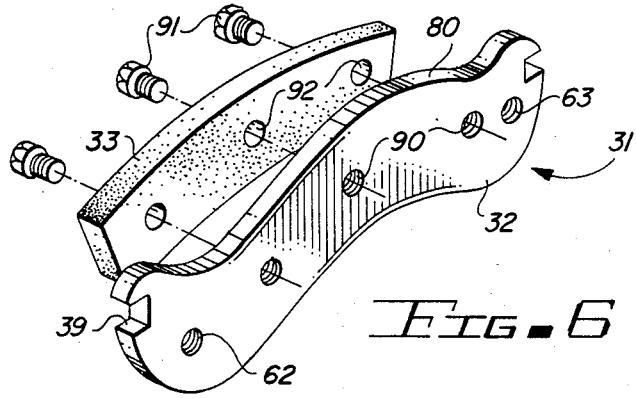
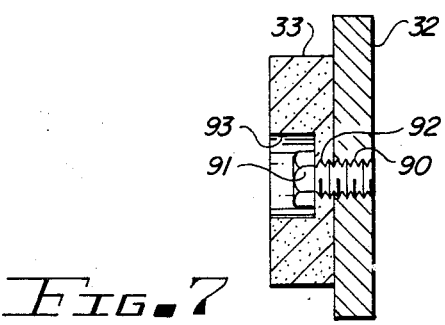
FIG.-6  FIG.-7
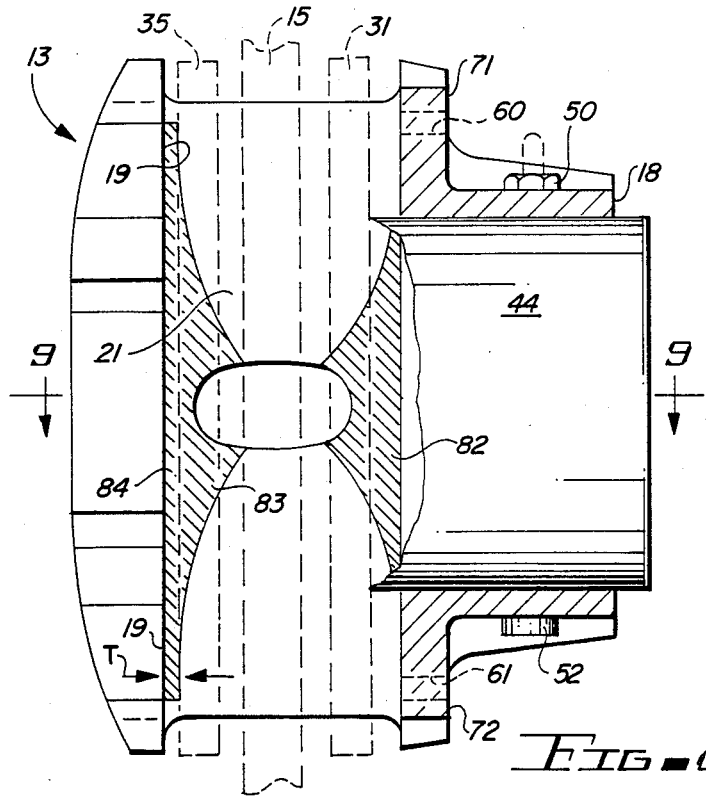
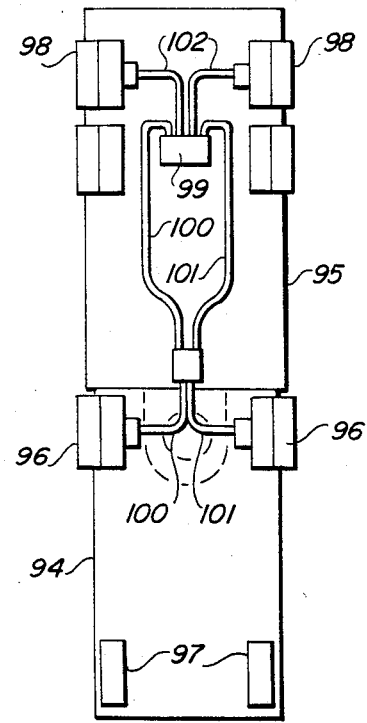
FIG.-8  FIG.-11

DISC BRAKE SYSTEM

This invention relates to disc brake systems for vehicles.

More particularly, the invention relates to a disc brake system of the general type including a brake frame having a pair of spaced apart rails, a pair of brake linings slidably carried on the brake frame rails, a circular rotor rotatably carried on the wheel assembly of a vehicle and having smooth planar inboard and outboard contact faces, a caliper assembly slidably mounted on the rails of the brake frame, and, a brake pedal operatively associated with the caliper assembly, the caliper assembly having a piston which when actuated by depressing the brake pedal first forces one brake lining against the inboard contact face of the rotor and then causes the caliper assembly to slide along the brake frame rails to force the other brake lining against the outboard contact face of the rotor.

In another respect, the invention pertains to a disc brake system of the type described which, when the brake pedal is depressed to force the brake linings against the rotor and is then released, minimizes the likelihood that the caliper assembly piston will jam in position and continue to force the brake linings against the rotor when the brake pedal is released.

In a further respect, the invention relates to a truck disc brake system which does not require the use of metal cinder brake pads and which, in comparison to conventional truck disc brake systems, markedly increases the operational life of the brake system rotor and brake linings.

In still another respect, the invention pertains to a disc brake system of the type described which, after the brake pedal is depressed to actuate the piston and force the brake linings against the rotor and is then released, facilitates the movement of the brake linings away from contact with the rotor.

The air disc brake system described in B. F. Goodrich promotional circular ESD-79-HB-1 entitled "Power Screw Air Disk Brakes" is designed to meet braking requirements for air-brake Class 6, 7 and 8 vehicles. B. F. Goodrich power screw air disc brakes may be used for 10,500 pound to 23,000 pound tractor or trailer axles. B. F. Goodrich air disc brakes include a brake frame having a pair of spaced apart rails, a pair of brake linings slidably carried on the brake frame rails, a circular rotor rotatably carried on the wheel assembly of a truck and having smooth planar inboard and outboard contact faces, and, a caliper assembly slidably mounted on the rails of the brake frame. The caliper assembly includes a piston which is actuated and extended by depressing the truck brake pedal. When the piston is actuated it forces one brake lining against the inboard contact face of the rotor and then causes the caliper assembly to slide along the brake frame rails to force the other brake lining against the outboard contact face of the rotor. The brake linings each include a backing portion and a pad portion. The pad portion contacts one of the rotor faces when the brake pedal is depressed and the caliper piston is displaced to force the linings against the rotor. When the brake pedal is released the piston retracts, permitting the brake linings to move away from the rotor. The pad portion of each lining is comprised of a metal cinder material. The rotor is fabricated from steel. The caliper assembly also includes a fitting for injecting grease into the assembly to lubricate the piston and includes a pressure relief fitting which permits grease to escape from within the caliper assembly when an excessive amount of grease is injected into the assembly.

The B. F. Goodrich disc brakes described above have encountered serious operational problems. The metal to metal frictional contact between the rotor and metal pad portions of the brake linings generates an enormous amount of heat which wears out the pad portions in 3,000 to 10,000 miles of driving and causes the rotor to crack and warp. Consequently, when worn brake linings are replaced the rotor must be machined. Another problem associated with the brakes is that after the brake pedal has been depressed to actuate and extend the caliper to force the brake linings against the rotor, the piston jams in the extended position and does not retract after the brake pedal is released. When the caliper assembly piston jams in the extended position, the pad portions of the brake linings continue to contact the rotor, generating additional heat and incurring additional wear. Finally, another drawback of the B. F. Goodrich disc brake system is that when the brake pedal is released and the caliper piston retracts, the brake linings tend to tilt in the caliper assembly such that the pad portions are not parallel to the rotor faces, and, such that an edge of each pad portion leans against and contacts the rotor, causing uneven wear of the pad portions of the brake linings.

Accordingly, it would be highly desirable to provide improved B. F. Goodrich air disc brakes which would markedly increase the operational life of the rotor and brake linings, would minimize the likelihood of the caliper piston jamming in extended position, and would insure that the brake linings do not tilt in the caliper assembly and lean against the rotor.

Therefore, it is a principal object of the invention to provide improved disc brakes for a vehicle.

Another object of the invention is to provide improved vehicle disc brakes of the general type including a brake frame having a pair of spaced apart rails, a pair of brake linings slidably carried on the brake frame rails, a circular rotor rotatably carried on the wheel assembly of a vehicle and having smooth planar inboard and outboard contact faces, and, a caliper assembly slidably mounted on the rails of the brake frame and having a piston actuated by depressing the brake pedal of a vehicle, the piston when actuated first forcing one brake lining against the inboard contact face of the rotor and then causing the caliper assembly to slide along the brake frame rails to force the other brake lining against the outboard contact face of the rotor.

A further object of the instant invention is to provide improved disc brakes of the general type described which minimize the amount of heat generated when the brake lining frictionally contacts the rotor and which markedly increases the operational life of the rotor and brake linings.

Still another object of the invention is to provide improved vehicle disc brakes of the general type described which minimize the likelihood that the caliper assembly piston will, when the brake pedal of a vehicle is depressed, jam in extended position and continue to force the brake linings against the rotor when the brake pedal is released.

These and other, further and more specific objects and advantages of the invention will be apparent to those skilled in the art from the following detailed description thereof, taken in conjunction with the drawings, in which:

FIG. 1 is a perspective view of an assembled conventional B. F. Goodrich disc brake unit;

FIG. 2 is an exploded perspective view of a conventional B. F. Goodrich disc brake unit;

FIGS. 3A–3C are side views of the rotor, brake linings, and caliper housing illustrating the mode of operation of the B. F. Goodrich brake unit of FIGS. 1 and 2;

FIG. 4 is a perspective view of a portion of the disc brake unit of the invention;

FIG. 5 is a top view of a portion of the disc brake unit of the invention;

FIG. 6 is an exploded perspective view of a brake lining of the disc brake unit of the invention;

FIG. 7 is a side section view of an assembled brake lining of the disc brake unit of the invention;

Figure 9:
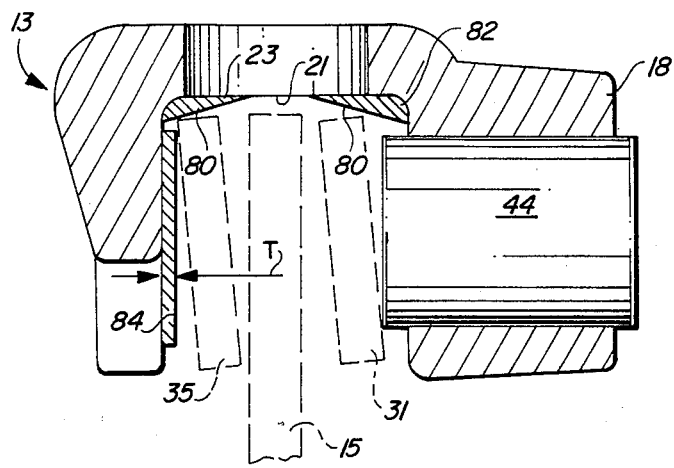
Figure 10:
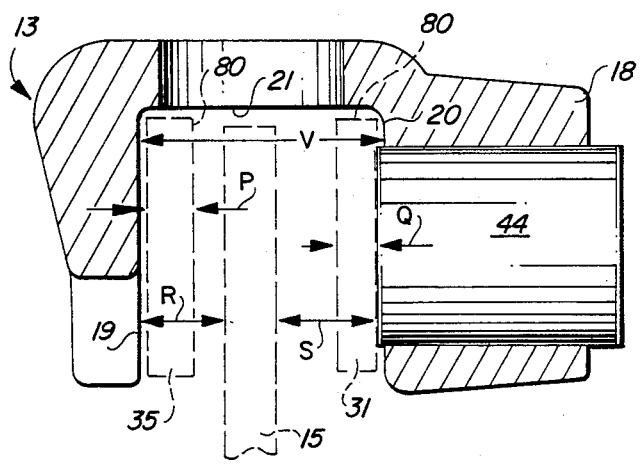

FIG. 8 is a bottom view of the caliper assembly housing of the disc brake unit of the invention illustrating areas of the B. F. Goodrich caliper assembly housing machined out to prevent tilting of the brake linings in the housing;

FIG. 9 is a side section view of the caliper assembly of FIG. 8 taken along section line 9—9 thereof and illustrating tilting of brake linings therein prior to machining of the caliper assembly; and FIG. 10 is a side section view of the caliper assembly of FIG. 8 illustrating elimination of tilting of brake linings in the assembly after machining portions thereof.

FIG. 11 is a tractor-trailer braking arrangement.

Briefly, in accordance with my invention, I provide an improved disc brake system for a vehicle. The system includes a wheel assembly connected to the vehicle; a circular rotor rotatably carried on the wheel assembly of the truck and having a pair of opposed circular faces; a brake frame fixedly attached to the vehicle; a support bracket connected to and carried on the frame and including a pair of spaced apart rails; inboard and outboard brake linings each including a backing portion and a pad portion attached to the backing portion, the brake linings spanning the distance between and being slidably carried on the rails of the support bracket, the backing portion of each pad including an upper edge; and, a caliper assembly slidably carried on the rails of the support bracket. The caliper assembly includes first and second spaced apart generally opposed walls, a portion of the rotor being positioned between said opposed walls at all times during operation of the brake assembly, the brake linings being carried on the rails in position between the walls of the caliper assembly so that the pad portions are opposed to the rotor faces and the backing portions are opposed to the walls of the caliper assembly; a piston housing aperture formed in the caliper assembly and through the first wall of the caliper assembly; a piston movably carried in the housing; means for moving the piston between at least three operative positions, a first operative position with the pad portions of the brake linings spaced away from the rotor faces, a second intermediate operative position with the piston displaced against the backing portion of the inboard brake lining to force the pad portion thereof against one of the rotor faces, and a third operative position with the piston displaced against the backing portion of the inboard brake lining to force the pad portion thereof against one of the rotor faces and to force the second wall of the caliper assembly against the backing portion of the outboard lining to press the outboard lining against the rotor, the caliper assembly sliding along the rails of the support member to move the second wall toward the rotor when the piston is moved from the second operative position to the third operative position; first and second apertures formed through the caliper assembly and the first wall thereof; first and second bolt means extending through each of the first and second apertures and each having an end connected to the backing portion of the inboard brake lining; and, means contacting each of the bolt means and, when the pad portion of the inboard brake lining contacts the rotor, exerting a force on the bolt means, the force acting in a direction away from the rotor. The force acting in a direction away from the rotor facilitates displacement of each bolt means through its respective aperture in said direction, facilitates the sliding displacement of the inboard brake lining along the rails of the support bracket away from the rotor, and, facilitates the displacement of the piston from the third to the second operative position.

Turning now to the drawings, which depict the presently preferred embodiment of the invention for the purpose of illustrating the practice thereof and not by way of limitation of the scope of the invention and in which like reference characters refer to corresponding elements throughout the several views, FIGS. 1 to 3 illustrate a conventional B. F. Goodrich power screw air disc brake unit including air chamber 11, caliper piston drive arm 12, caliper assembly 13, torque plate 14, and rotor 15. Rotor 15 includes circular planar inboard contact face 16 and outboard contact face 17 generally parallel and opposed to inboard contact face 16. Caliper assembly 13 includes piston housing member 18, outboard wall 19, and inboard wall 20 spaced away from and opposed and generally parallel to outboard wall 19. Ceiling 21 of assembly 13 spans the distance between and interconnects walls 19, 20. U-shaped grooves 20, 23 formed in caliper assembly 13 slidably engage rail 25 of U-shaped frame member 26. Member 26 is fixedly secured to torque plate 14 by bolts 28 thereof. U-shaped grooves (not visible) identical to grooves 20, 23 are formed in the side of assembly 13 opposite the side having grooves 20, 23. The U-shaped grooves (not visible) on the opposite side of assembly 13 slidably engage rail 30 of support member 26. Brake lining 31 includes elongate backing portion 32 and metal cinder pad portion 33 fixedly attached to backing portion 32. Brake lining 35 includes backing portion 36 and metal cinder pad portion 37 fixedly secured to backing portion 36. U-shaped grooves 38, 39 formed in the near ends of linings 31, 35 slidably engage rail 25. Similar U-shaped grooves formed in the far ends of linings 31, 35 slidably engage rail 30 of support member 26. Grease is injected into piston housing member 18 through fitting 40. Pressure relief valve 41 permits grease to escape from housing 18 when excess grease is injected through fitting 40.

FIGS. 3A to 3C illustrate the general mode of operation of the disc brake unit of FIGS. 1 and 2. In FIG. 3A the vehicle is moving and rotor 15 is turning on a wheel assembly of the vehicle without the brake unit being utilized. Piston 44 is in retracted position and pad portions 33, 37 of brake linings 31, 35 are spaced away from opposed faces 16, 17 of rotor 15. When the vehicle brake pedal is depressed, piston 44 begins to extend in the direction of arrow A as shown in FIG. 3B and presses pad portion 33 of lining 31 against rotor face 16. After pad portion 33 contacts rotor 15, piston 44 continues to extend in the direction indicated by arrow A in FIG. 3B. This continued movement of piston 44 in the direction of arrow A after lining 31 contacts rotor 15 causes caliper assembly 13 to be displaced in the direction of arrows B in FIG. 3C such that outboard face 19 of assembly 13 contacts backing portion 36 of lining 35 and forces pad portion 37 thereof against rotor face 17. The combined pressure of pads 33, 37 against rotor 15 stops the rotation of the rotor. When the vehicle brake pedal is released, piston 44 retracts in the direction of arrows B and piston 44, caliper 13 and brake linings 31, 35 reassume the position shown in FIG. 3A. Air chamber 11, lever arm 12 and other system components control the displacement of piston 44 in directions A and B when the vehicle brake pedal is depressed and released.

In utilizing the B. F. Goodrich disc brake system shown in FIGS. 1 to 3, the trucking industry has found that piston 44 tends to become jammed in the extended position illustrated in FIG. 3C and will not, when the vehicle brake pedal is released, retract to its original position of FIG. 3A. The jamming of piston 44 in the extended position of FIG. 3C is believed to result when pressure relief valve 41 becomes plugged so that excess grease injected into housing 18 through fitting 40 under pressure cannot escape through valve 41. Once valve 41 becomes plugged, grease accumulates in housing 18 under increasing pressure. This pressure acts against piston 44 and maintains the piston in the extended position of FIG. 3C.

In the disc brake system of the invention, illustrated in FIGS. 4 to 10, fitting 40 is removed from piston housing 18 and bolt 50 inserted to seal the opening 51 into which fitting 40 is normally threaded. Pressure relief valve 41 is also removed from housing 18 and is replaced with an orifice 52 which vents the interior of housing 18 to the atmosphere. Caliper assembly 13 is taken apart and housing 18 and piston 40 are packed with grease. Caliper 13 is then reassembled. Caliper assembly 13 is periodically torn down, taken apart, cleaned, and repacked with fresh grease. Any excess grease inside housing 18 readily escapes through orifice 52. The utilization of bolt 51 and orifice 52 prevents a build up of pressure within piston housing 18. The pressure inside housing 18 is, of course, generally always equal to atmospheric pressure.

As shown in FIGS. 4–6 and 8, apertures 60, 61 are formed through caliper assembly 13 and apertures 62, 63 are formed through backing portion 32 of lining 31. Bolt 64 slidably extends through apertures 60 and 62. Nut 66 is attached to the end of bolt 64 extending through aperture 62. Spring 65 is positioned between head 70 of bolt 64 and surface 71. A second bolt (not shown) identical to bolt 64 is slidably positioned in apertures 61, 63 and a nut identical to nut 66 is attached to the end of the second bolt extending through aperture 63 toward rotor 15. A spring identical to spring 65 is positioned between the head of the second bolt and surface 72 of caliper assembly 13. When the brake pedal of a vehicle is depressed and piston 44 displaces lining 31 towards rotor 15, back portion 32 of lining 31 pushes against nut 66 and the nut on the second bolt to slidably pull bolt 64 and the second bolt through apertures 60, 61 in the direction of arrow C in FIG. 5 and to compress spring 65 and the identical spring associated with the second bolt. When spring 65 and its partner spring associated with the second bolt are compressed they exert a force against head 70 and the head of the second bolt in the direction of arrow D in FIG. 5. This force assists in retracting piston 44 and in pulling brake lining 31 away from rotor 15 when the vehicle brake pedal is released.

In FIGS. 8 and 9 hatched areas 82, 83, 84 represent portions of a conventional B. F. Goodrich caliper assembly which are not included in the disc brake of the invention, or, which are simply machined out of existing B. F. Goodrich caliper assemblies. In B. F. Goodrich disc brake units, linings 31, 35 are sized such that the top edges 80 of the linings can contact thatched areas 82, 83 causing the linings to tilt against rotor 15 as the linings slide back and forth along rails 25, 30 of frame 26 during operation of the disc brake unit. Machining thatched areas 82, 83 from ceiling 21 of caliper assembly 13 provides sufficient clearance so that upper edges 80 of linings 31, 35 do not contact ceiling 21 as they slide along rails 25, 30. As is depicted in FIG. 10, when thatched areas 82, 83 are machined from existing conventional B. F. Goodrich disc brake units, linings 31, 35 do not contact ceiling 21 and the pad portions of linings 31, 35 generally remain parallel to the faces of rotor 15 as linings 31, 35 move back and forth along rails 25, 30. When thatched portion 84 is machined from an existing conventional B. F. Goodrich air disc brake unit, thicker pad portions 33, 37 can be utilized on the brake linings.

FIGS. 6 and 7 illustrate the presently preferred brake linings of the invention including a backing portion 32 having internally threaded apertures 90 formed therethrough to receive externally threaded bolts 91. Apertures 92 are formed through brake pad portion 33. Each aperture 92 is provided with countersunk aperture 93 sized to receive the head of a bolt 91. Bolts 91 permit a worn pad 33 to be readily removed from backing 32 and replaced with a new pad.

The truck of FIG. 11 includes tractor 94 and trailer 95. Tractor 94 is provided with rear wheels 96 and front wheels 97. Trailer 95 is provided with rear wheels 98 and air control unit 99. Compressed air lines 100, 101, 102 lead from control unit 99 to the disc brake units associated with wheels 96, 98. Control unit 99 is activated when the truck driver depresses the brake pedal. When unit 99 is activated, compressed air flows through lines 100,101,102 to the air disc brake units associated with wheels 96, 98 and causes the units to operate to brake the truck. The braking system of FIG. 11 is designed such that when the driver depresses the brake pedal of the vehicle, the disc brake units associated with wheels 98 engage and slow rotors 15 associated with wheels 98 just before the brake units associated with wheels 96 engage and slow the rotation of wheels 96. Braking wheels 98 prior to braking wheels 96 or other wheels forward of rear wheels 98 stabilizes the truck while it is stopping and tends to greatly minimize the likelihood the truck will jackknife or shimmy while it is being braked.

Brake pads 33 are presently fabricated with three polymer resins impregnated with fiber glass, zinc and brass particles.

Conventional B. F. Goodrich truck disc brakes includes "chatter" retainer spring clips (B. F. Goodrich Part No. 56-741, Service Kit No. 304-204 shown on page 4, in "Illustrated Parts List with Service Kit Reference" of B. F. Goodrich Circular OH 186 entitled *Air Disk Brake Parts Catalog for Truck, Tractors and Trailers*) which bear against the caliper housing 13. The disc brake system of the invention does not utilize these retainer clips. Removing the chatter springs permits housing 13 to slide more freely along rails 25, 30.

The disc brake system of the invention typically extends the operational life of rotor 16 to from 750,000 to 1,000,000 miles of truck travel. The rotor in a conventional B. F. Goodrich disc brake system normally has an operational life of approximately 60,000 to 90,000 miles.

The temperature generated at the interface of polymer resin-brass-zinc-fiber glass pads 33, 37 and rotor 16 when the disc brakes of the invention are utilized to stop a truck is in the range of 200° F. to 800° F. When a truck is being braked on level ground the temperature generated when pads 33, 37 frictionally engage rotor 16 is usually in the range of 200° F. to 250° F. In contrast, when the conventional B. F. Goodrich disc brakes are utilized, temperatures in the range or 1000° F. to 1800° F. are generated when the metal cinder brake pads 33, 37 are forced against rotor 16.

The coefficient of friction for the polymer resin pads 33, 37 utilized in the disc brake system of the invention is 40 to 50. This means rotor 16 is effectively slowed as soon as pads 33, 37 contact rotor 16 during braking of a vehicle. The metal cinder pads 33, 37 utilized in a conventional B. F. Goodrich disc brake system must contact rotor 15 and frictionally generate a substantial amount of heat before they effectively engage and slow rotor 16.

When, during the operation of a conventional B. F. Goodrich disc brake system and the system of the invention, a truck driver depresses the brake pedal, unit 11 is activated causing piston 100 (FIGS. 1 and 2) to be displaced and extended in the direction of arrow N to rotate arm 12 clockwise in the direction of arrow M. When arm 12 is rotated in the direction of arrow M, piston 44 is displaced towards rotor 16 and brake linings 31, 35 are forced against rotor 16. In a conventional B. F. Goodrich truck disc brake system the thickness of the inboard and outboard pads 33, 37 is 0.75 inch, the thickness of the inboard backing 32 is 0.5 inch, and the thickness of the outboard backing 36 is 0.25 inch. In the brake system of the invention the thickness of the inboard backing 32 is 0.3125 to 0.375 inch, of the outboard backing 36 is 0.25 inch, of the inboard pad 33 is 1.125 inches, and, the thickness of the outboard pad is 1.0625 inches. Accordingly, the overall thickness Q and P of brake linings 31, 35 are greater in the disc brake system of the invention than in a conventional B. F. Goodrich brake system. The overall thickness Q of the inboard brake lining 31 in the system of the invention is 1.4375 inches; in a conventional B. F. Goodrich system thickness Q is 1.25 inches. The overall thickness P of the outboard brake lining 35 in the system of the invention is 1.3125 inches; in the conventional B. F. Goodrich system thickness P is 1.00 inches. This means linings 31 and 35 utilized in the invention take up a greater proportion of spaces S and R, respectively, in caliper 13 than do linings 31, 35 in a conventional B. F. Goodrich disc brake system. Consequently, when the disc brake system of the invention is utilized to slow a vehicle, pads 33, 37 contact rotor 16 more quickly than when they would in a conventional B. F. Goodrich brake system. In the system of the invention arm 100 (FIGS. 1 and 2) has to travel a shorter distance in the direction of arrow N to force pads 33, 37 against rotor 16 than arm 100 has to travel to force pads 33, 37 against rotor 16 in a conventional B. F. Goodrich disc brake system. The use of thicker brake linings 31, 35 in the system of the invention also prevents pivot point 101 from moving too far "past center" before pads 33, 37 contact rotor 16. Point 101 has moved past center when the angle W between arm 100 and line Z is less than ninety degrees. Line Z passes through pivot point 101 and through the center of circular knob 102.

When conventional B. F. Goodrich disc brakes are modified to the brake system of the invention an area 84 (FIGS. 8 and 9) 0.20 inch thick is machined from face 19. Therefore, in the brake system of the invention, distance V (FIG. 10) between faces 19 and 20 is equal to 0.20 inch plus the distance V in a conventional B. F. Goodrich caliper 13.

Having described my invention in such terms as to enable those skilled in the art to understand and practice it and having identified the presently preferred embodiments and best mode thereof, I claim:

1. A disc brake system for a vehicle, said system including
   (a) a wheel assembly connected to said vehicle;
   (b) a circular rotor rotatably carried on said wheel assembly of said vehicle and having a pair of opposed circular faces;
   (c) a brake frame fixedly attached to said vehicle;
   (d) a support bracket connected to and carried on said frame and including a pair of spaced apart rails;
   (e) inboard and outboard brake linings each including a backing portion and a pad portion attached to said backing portion, said brake linings spanning the distance between and being slidably carried on said rails of said support bracket, said backing portion of each pad including an upper edge;
   (f) a caliper assembly slidably carried on said rails of said support bracket and including
      (i) first and second spaced apart generally opposed walls, a portion of said rotor being positioned between said opposed walls at all times during operation of said brake assembly, said brake linings being carried on said rails in position between said walls of said caliper assembly so that said pad portions are opposed to said rotor faces and said backing portions are opposed to said faces of said caliper assembly,
      (ii) a piston housing aperture formed in said caliper assembly and through said first wall of said caliper assembly,
      (iii) a piston movably carried in said housing,
      (iv) means for moving said piston between at least three operative positions,
         a first operative position with said pad portions of said brake linings spaced away from said rotor faces,
         a second intermediate operative position with said piston displaced against said backing portion of said inboard brake lining to force the pad portion thereof against one of said rotor faces,
         a third operative position with said piston displaced against said backing portion of said inboard brake lining to force the pad portion thereof against said one of said rotor faces and to force said second wall said caliper assembly against said backing portion of said outboard lining to press said outboard lining against said rotor, said caliper assembly sliding along said rails of said support member to move said second wall toward said rotor when said piston is moved from said second operative position to said third operative position,
      (v) first and second apertures formed through said caliper assembly and said first wall thereof, (vi) first and second bolt means extending through each of said first and second apertures and each having an end connected to said backing portion of said inboard brake lining, (vii) means contacting each of said bolt means and, when said pad portion of said inboard brake lining contacts said rotor, exerting a force on said bolt means, said force acting in a direction away from said rotor and facilitating the displacement of said bolt means through said aperture in said direction, the sliding displacement of said inboard brake lining along said rails of said support bracket away from said rotor, and the displacement of said piston from said third to said second operative position.

2. The brake system of claim 1 including a vent orifice formed in said caliper assembly and connecting said piston housing aperture to the atmosphere.

3. The brake system of claim 1 wherein said ceiling surface of said caliper assembly is shaped, contoured and dimensioned such that said upper edges of said inboard and outboard brake lining do not contact said ceiling when said piston is displaced between said first, second and third operative positions to move said linings along said rails of said support member.

4. The brake system of claim 1 wherein said vehicle is a truck and said pad portion of said brake lining comprises a polymer material impregnated with metal particles.

5. The brake system of claim 1 wherein
(a) said vehicle is a truck including a tractor and a trailer, said tractor including
 (i) front and rear wheels,
 (ii) a brake system associated with a plurality of said wheels;
(b) said trailer includes rear wheels spaced away from said rear wheels of said tractor; and,
(c) said disc brake system is operatively associated with at least one of said rear wheels of said tractor, said braking system for said wheels of said tractor and said disc brake system for said rear wheel being operatively associated such that when said braking systems are activated to reduce the speed of said truck, said disc brake system engages and slows said rear wheels of said trailer before said tractor braking system engages and slows said wheels thereof.

* * * * *